United States Patent [19]
Parker et al.

[11] Patent Number: 6,163,595
[45] Date of Patent: Dec. 19, 2000

[54] WAY FINDING WITH AN INTERACTIVE FACEPLATE

[75] Inventors: Janice Maxine Parker, Cary; John Radie Moseby, Chapel Hill; Diana Arden Rupp; Barry Dean Huffman, both of Cary, all of N.C.

[73] Assignee: Nortel Networks Limited, Canada

[21] Appl. No.: 09/301,849

[22] Filed: Apr. 29, 1999

[51] Int. Cl.[7] .................................................. H04M 1/24

[52] U.S. Cl. ............................. 379/22; 379/12; 379/20; 379/22; 379/26; 455/423; 455/560; 455/561

[58] Field of Search .................................. 379/12, 17, 20, 379/22, 26; 455/423, 424, 425, 560, 561

[56] References Cited

U.S. PATENT DOCUMENTS

| | | | |
|---|---|---|---|
| 5,049,873 | 9/1991 | Robins et al. | 379/14 |
| 5,544,222 | 8/1996 | Robinson et al. | 379/58 |
| 5,867,689 | 2/1999 | McLain, Jr. | 395/500 |
| 5,946,373 | 8/1999 | Harris | 379/26 |

*Primary Examiner*—Curtis A. Kuntz
*Assistant Examiner*—Quoc Tran

[57] ABSTRACT

An interactive electronic module (IEM) is adapted as a retrofit module for use in modular network equipment to provide real time analysis of trunk line signal performance and to detect trunk line signal faults, the IEM including a faceplate display panel accessible to the network operator for displaying the detected signal faults and for providing operator access to the IEM to command the display of selected trunk line faults.

24 Claims, 6 Drawing Sheets

WAY FINDING WITH AN INTERACTIVE FACEPLATE

FIELD OF INVENTION

This invention relates to network systems, and more particularly to apparatus for assisting a network system operator in performing, real time fault isolation in an operating system.

BACKGROUND OF THE INVENTION

Effective management of network systems, including telephone systems, is necessary to optimize the system's operational capabilities and to minimize signal traffic disruptions. Management objectives include anticipating service deterioration and the quick isolation and repair of the causes of disruption and/or failure. This requires that operational performance monitoring and system fault isolation be performed in real time, during system operation, and with minimum signal traffic disruption. Fault management in particular must include the ability to isolate and repair faults quickly enough to comply with BELLCORE service quality standards.

The timely isolation and repair of faults first requires an ease of access to the system equipment and wiring by the system operator, or craftsperson. Secondly, with access, the craftsperson must have the ability to apply fault diagnostics to quickly isolate failures to the system's switching equipment or to the network wiring since network faults require the assistance of the network operator and, therefore, greater lead time, while system faults may be repaired by the system operator alone. The difficulty in applying timely fault diagnostics is in the availability of diagnostic equipment at the point of system access. Typically portable diagnostic equipment must be used, which itself takes time to set-up and run, adding to the disruption cycle time.

It is desirable, therefore, to provide a system having both ease of access as well as built in system diagnostic equipment capable of responding to an operator in an interactive manner to enable timely fault isolation. While this capability may be added to newly designed systems it is not often practical, or even possible, to retrofit installed systems in a manner to provide both access and diagnostic capability. Even with newly designed systems, while there is the recognition of the value that designed access and built-in diagnostics provide to the system, there may be concern for the equipment configuration required to provide such access as well as concern that the added diagnostics will reduce system reliability.

DISCLOSURE OF THE INVENTION

The present invention is to apparatus capable of providing real time analysis of trunkline signal performance, and for annunciating trunk signal failures in a front panel display accessible to an operator. The invention is of particular utility in network installations in which the required density of trunk lines, or spans, at each interface prohibits the use of traditional methods.

According to one aspect of the invention the apparatus includes an interactive electronic modules (IEM) to provide bi-directional translation of the trunk signals between the network PCM protocol and the parent telephone system's proprietary protocol, while simultaneously providing real time performance monitoring and fault detection of the trunk signal content. In further accord with this aspect of the invention, the IEM includes a faceplate having signal display apparatus for providing visual reports to an operator of detected network events, including identification of fault types and fault location.

In still further accord with this aspect of the invention, the IEM faceplate includes an operator responsive input device which permits the operator to command the display of the presence and absence of signal faults on each individual one of the tunk lines connected to the IEM. In yet still further accord with this aspect of the invention, the IEM signal display apparatus includes an array of signal annunciators, each annunciator in the array being adapted to provide individual display of an individual type fault, whereby the array provides visual display of all present faults on each trunkline selected by an operator.

According to another aspect of the invention, the apparatus provides on-line, real time performance monitoring and fault detection while maintaining the network quality of service standards by having redundant, primary and secondary IEMs mounted in a termination interface module (TIM) which routes the trunkline signals to each IEM jointly; the redundant IEMs being operated as a primary and secondary pair in which the secondary becomes operable in the event of failure of the primary IEM.

In further accord with this aspect of the invention, each TIM mounted IEM may be individually removed in a manner which is transparent to the operation of the adjoining IEM and to network performance, thereby isolating network quality of service from single IEM failures. In still further accord with this feature of the invention, each IEM additionally performs, when active, self health diagnostics which, in the event of a detected self health failure causes automatic switchover to the alternate IEM, thereby providing for dual failure reliability of the IEM function.

Other aspects and features of the present invention will become apparent to those ordinarily skilled in the art upon review of the following description of specific embodiments of the invention in conjunction with the accompanying figures.

BEST MODE FOR CARRYING OUT THE INVENTION

In the following description of a best mode embodiment, the invention is described in connection with its application in a GSM protocol wireless telephone system. However, it should be understood that the invention is not limited to such an application, may be used in connection with any type network application, both wireless and wireline systems, and may also have utility in other generalized applications.

Figure 2:
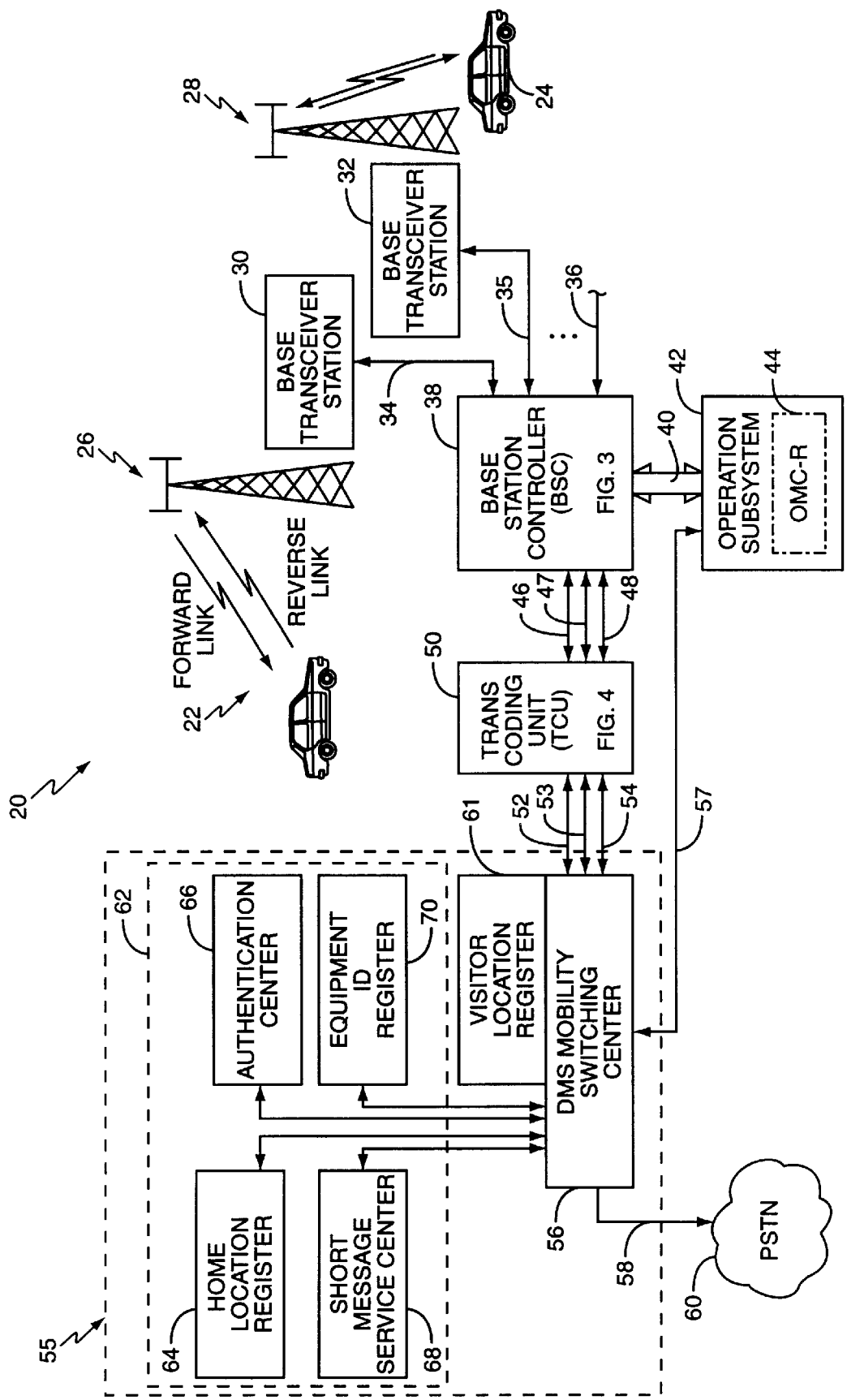
FIG. 2, is a block diagram illustration of a wireless telephone network embodiment in which the present invention may be used.

Referring first to FIG. 2, which is a system block diagram of the architecture of a known type wireless communication system 20, such as the Nortel Networks Model PCS 1900 Digital Cellular System, in which the present invention may be used. In the system 20 mobile handset users 22, 24 have full duplex wireless communications through antennas 26, 28 with base transceiver stations (BTSs) 30, 32. The BTSs 30, 32 are the radio-to-wireline interface between the handset users 22, 24 and the system's wireline network, and they provide both dynamic power control and frequency hopping to maintain voice call quality. The BTS 30, 32 are connected through trunk lines 34–36 to the system's base station controller (BSC) 38. The trunk line 34–36 may be dual twisted pair copper wire, (PCM 30 or DS1) coaxial cable, (PCM 30 only); all of which provide differential signal transmission of the voice and data digital signals between the BTS 30, 32 and the BSC 38.

The BSC 38, which is described in further detail hereinafter with respect to FIG. 3, manages all of the radio resources of the BTS 30, 32, including hand-offs, traffic concentration and radio channel allocation. The BSC 38 communicates through lines 40 with the network's operation subsystem 42. The subsystem 42 includes the Operations and Maintenance Center-Radio (OMC-R) 44, which is a graphical interface that provides operation and maintenance functions, including performance management of the BSC.

The format of the digital signal transmission from the BTS 30, 32 is in either a DS-1 (also known as T1) or PCM 30 (also known as a E1) protocol. As known the DS-1 protocol includes 24, eight bit channels per 125 microsecond frame; each channel sample having a byte interval of 5.2 microseconds. Alternatively, the PCM 30 is frame formatted for either 30 voice channels and two service channels or 31 voice channels and one service channel; in either case totals 32, eight bit channels in a 125 microsecond frame resulting in a channel byte interval of 3.906 microseconds. The BSC 38 provides the signals from the BTS 30, 32 on lines 46–48 to a transcoding unit (TCU) 50. The signal data rate between the BTSs, the BSC and TCU 50 is either 8 Kbps or 16 Kbps, which is the wireless system speech compression rate. The TCU 50 translates the wireless system signal speed to 64 Kbps PCM speech.

The BTS 30, 32, BSC 38, operation subsystem 42 arnd TCU 50 collectively comprise the Base Station Subsystem (BSS) which functions as the interface between the mobile handset users 22, 24 and the Network Switching Subsystem (NSS) 55. The NSS 55 provides the switching, mobility and subscriber management and intelligent networking activities required to provide the seamless and secure operation of the wireless system. The NSS includes the network DMS Mobility Switching Center (DMS-MSC) 56 which is connected through lines 57 to the Operation Subsystem 42 and through lines 58 to the public switch telephone network 60.

The DMS-MSC, which may comprise a Nortel Networks model Digital Multiplex System (DMS) 100 digital switch running wireless software, coordinates the call setup to and from the PSTN and the Base Station Subsystem. The DMS-MSC also includes a visitor location register (VLR) 60, which stores information about subscribers currently registered in the service area, enabling an operator to track subscribers as they roam throughout the GSM network.

The second main element of the NSS 55 is the intelligent network (IN) 62, which includes databases and processing for subscriber and equipment validation, subscriber tracking, and service delivery. Components of the IN 62 include: a home location register (HLR) 64, an authentication center 66, a short message service (SMS) center 68 and an equipment identity register 70. All of which are connected to the DMS-MSC 56.

Figure 3:
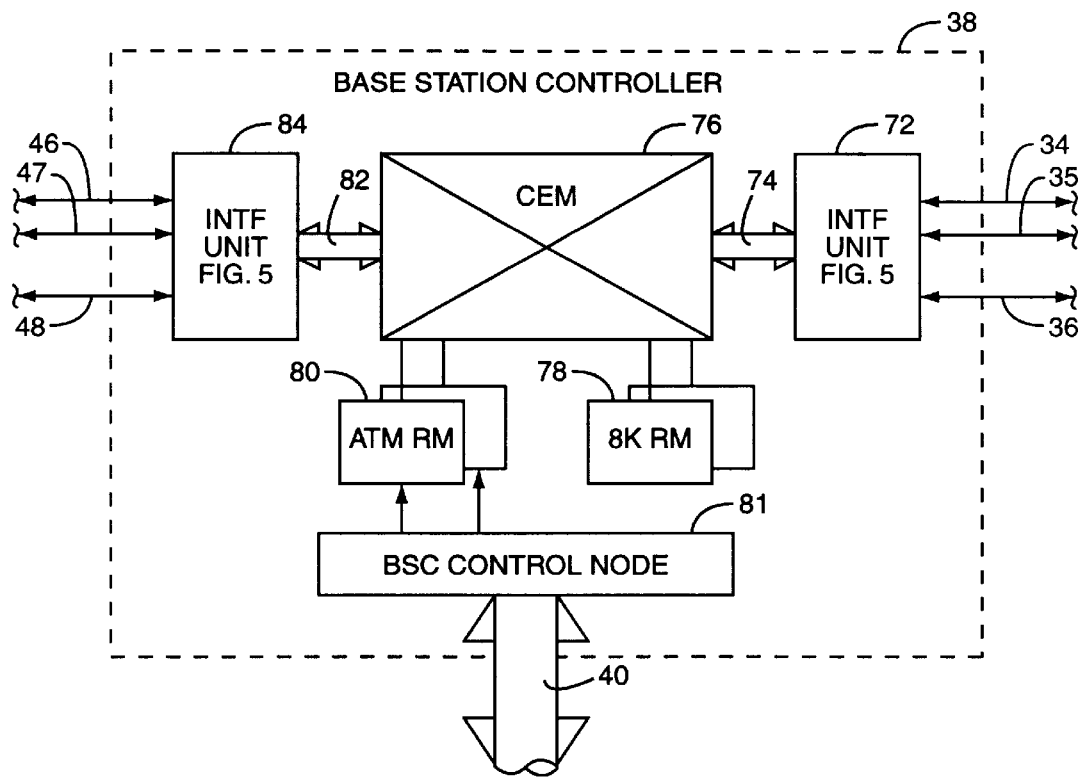
FIG. 3, is a schematic block diagram of one portion of the embodiment FIG. 2.

FIG. 3 is a system block diagram of the base station controller 38. The BSC receives the trunk lines 34–36 at an interface unit 72. As described in detail hereinafter with respect to the following Figures, the interface unit 72 provides certain levels of system diagnostics, including performance measurement and fault detection. In the present invention, the interface also provides for interactive technician-system procedures which permit the technician to isolate and access individual trunk lines. The voice and data channels are passed from the interface unit through lines 74 to the BSC Conmmon Equipment Module (CEM) 76.

As known the CEM 76 provides the central processing for the BSC 39 as well as providing the time switching of the pulse code modulated (PCM) data and the routing of the PCM data between the interface unit 72 and the 8 Kbps remote module (RM) time switch 78. The CEM 76 also communicates through the ATM resource module (RM) interface 80 with the ATM backplane (not shown) of the BSC Control Node 81, which in turn communicates through lines 40 with the operation subsystem 42 (FIG. 2).

In the present invention, the operation of the BSC 38, including the CEM 76 is that required by the particular system application and/or system performance parameters, all of which is well known to those skilled in the art. The CEM passes the process voice and data channel signals through lines 82 to a second interface unit 84, which connects the CEM through the lines 46–48 to the TCU 50 (FIG. 2). The configuration and function of the interface 84 is identical to that of the interface 72.

Figure 4:
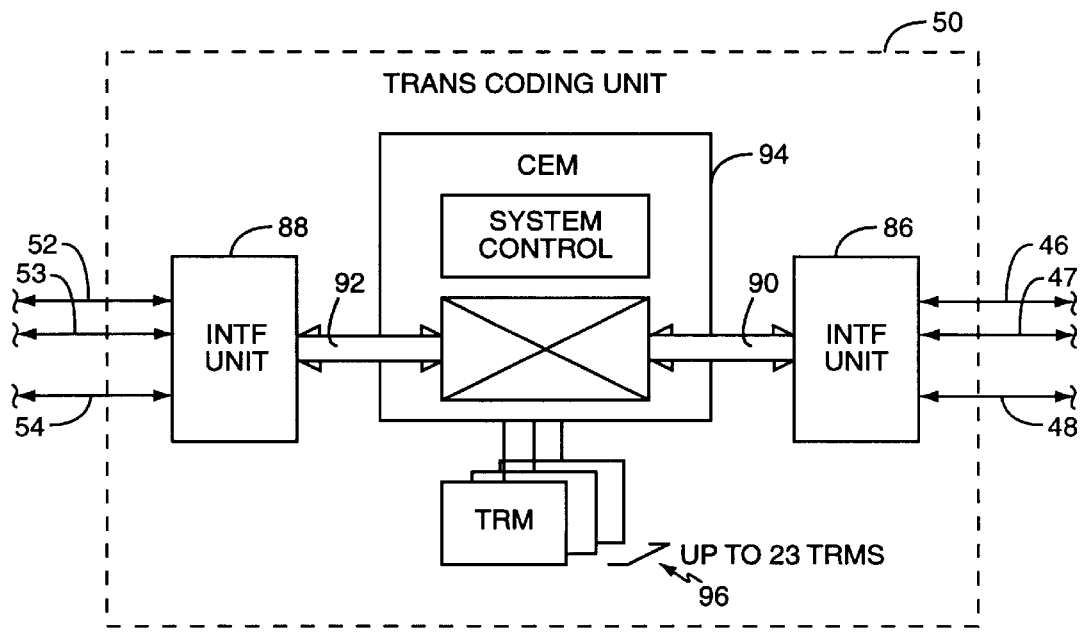
FIG. 4, is a schematic block diagram of another portion of the embodiment of FIG. 2.

FIG. 4 is a simplified block diagram of the TCU 50. According to the present invention the TCU is also connected to the system trunk lines 46–48 and 52–54 through interface units 86 and 88 which are connected through lines 90, 92 to the CEM 94 of the TCU 50. Once again, other than the interface units 86, 88, the TCU 50 is similar in both configuration and function to transcoding units known in the art. The function of the CEM is to provide the central processing for the TCU as well as to provide time switching routing of the PCM data between the interface units 86, 88 and the transcoding resource modules (TRMs) 96. The interface units 72, 84, 86 and 88 are substantially identical in terms of function, performance and configuration.

Figure 5:
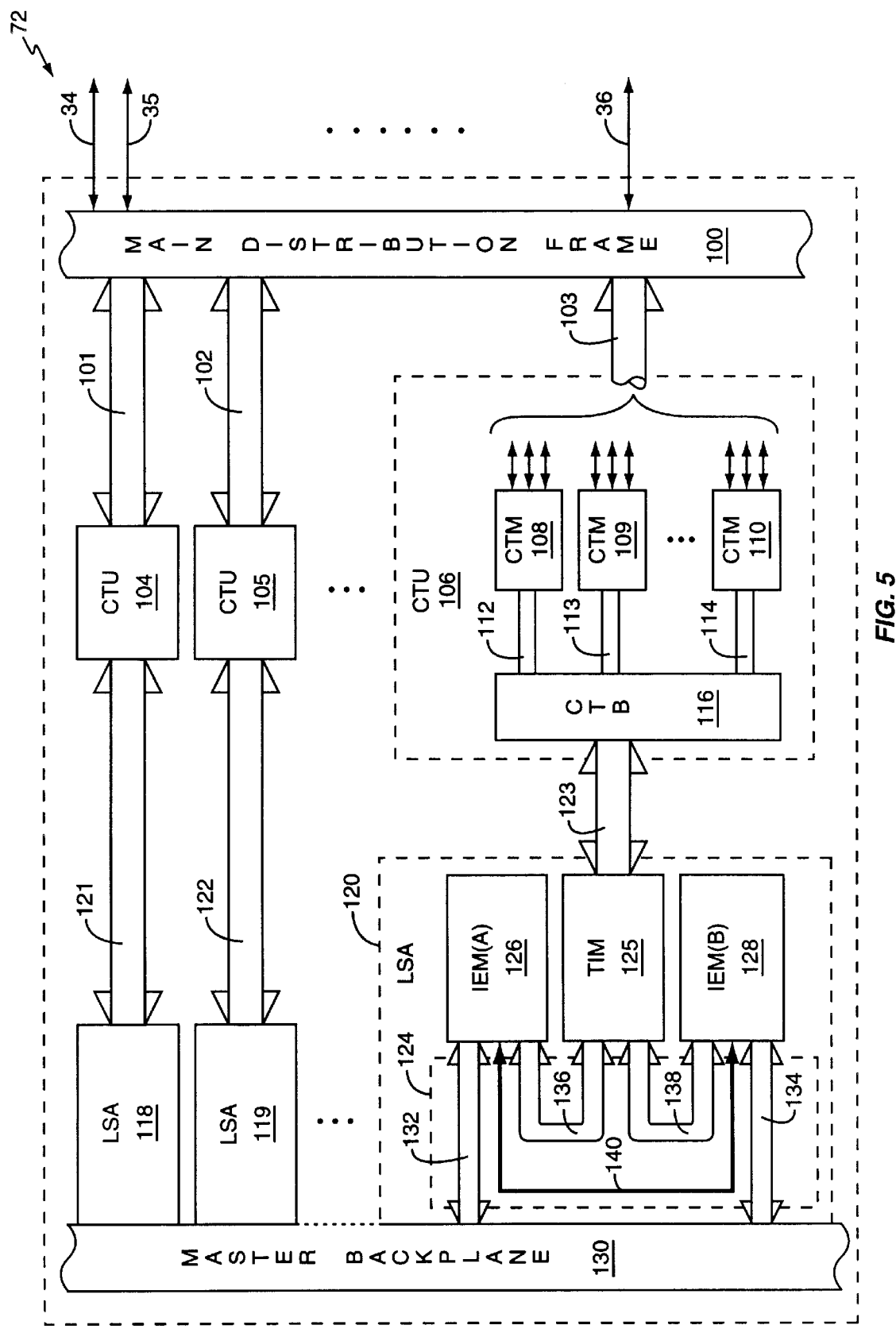
FIG. 5, is a detailed schematic diagram of one element of the portion illustrated in FIG. 3.

FIG. 5 is a system block diagram of the interface unit 72, which is representative of all of the interface units. In FIG. 5 the trunk lines 34–36 from the BTS 30, 32 (FIG. 2) are received at the BSC at a Main Distribution Frame (MDF) 100. The MDF functions as a terminal to receive the trunk line and to provide a transition point between the outside trunk lines and the BSC hardware. The DS-1 or PCM 30 trunk lines are shown as groups of signal lines 101–103 which are routed from the MDF 100 to a plurality of cable transition units (CTUs) 104–106. As shown by the CTU 106, each include a plurality of cable transition modules (CTMs) 108–110, each of which typically receive up to 3 of the signal lines in each group of lines 101–103.

The actual number of lines received at each CTM is a function of system bandwidth and also the type of signal format (i.e., either DS-1 with 28 inputs or PCM 30 with 21 inputs). The CTMs provide secondary surge protection (primary surge protection, including lightening protection being provided at the MDF 100 or on the line side of the MDF), passive impedance matching electronics in the case of PCM 30 trunk lines, and manual loopback switches. The loopback switches, as described in detail hereinafter, permit isolation of trunk line signal faults to either the BSC equipment itself or to the incoming trunk lines 34–36.

Each CTM is a multilayer circuit board assembly which supports up to three PCM 30 lines, either twisted pair, coaxial, or optical fiber. In the present embodiment the lines are assumed to be twisted pair. Up to 21 PCM 30 signal lines are directed to each CTU 104–106, which presents 3 to each of its CTMs; a total of 7 CTMs in a best mode embodiment of the CTU. The network signals from CTMs 108–110 are coupled through lines 112–114 to a cable transition board (CTB) 116, and from the CTB to a plurality of low speed access (LSA) modules 118–120, through lines 121–123.

As described hereinafter with respect to FIG. 6, the CTUs are installed in cabinetry which, is required to be located adjacent the cabinetry housing the LSAs 118–120. As described hereinafter, the LSAs provide interactive, diagnostic capability with the network's technical person, or operator in a Human Machine Interface (HMI) protocol. As shown by the LSA 120, each LSA comprises a termination interface module (TIM) 125 which receives the PCM 30 lines 123, performs inactive electromagnetic interference (EMI) filtering (not shown), and presents the trunk signal lines through a mini-backplane connector 124 to each of two redundant interface electronics modules (IEMs) 126, 128.

The mini-backplane 124 is a connector assembly which is shown schematically in FIG. 5. The mini-backplane 124 provides the electrical signal interconnections and the mechanical mounting interface between the TIM 125 and IEM 126, 128 modular configuration and the master backplane 130, i.e the electrical signal connector mounted in the cabinetry housing the LSAs 118–120. In FIG. 5, the mini-backplane 124 is illustrated in figurative fashion to demonstrate the inner connections provided between the TIM 125 and the IEMs 126, 128, together with their connection to the master backplane 130. These interconnections include lines 132, 134 from the IEMs 126, 128 to the master backplane and lines 136, 138 from the TIM 125 to each of the IEMs 126, 128. Finally, lines 140 provide direct electrical signal interconnection between IEMs, thereby allowing the two IEMs to exchange control and status information.

As described hereinbefore, the object of the present invention is to provide improved technician-operator access to the trunk line spans to be able to perform signal fault isolation in a timely and efficient manner; in compliance with the BELLCORE quality standards. As described hereinafter with respect to FIG. 8, the IEMs 126, 128 each include computer-based electronics for performing performance monitoring and fault detection from among the trunk lines passing through the LSA 120. As a result of the complexity and circuit board density of the IEMs, two IEMs are provided in each LS.A to improve LSA reliability. However, only one IEM is operational at a time; the second IEM acting as backup in the event of failure of the first one.

Figure 6:
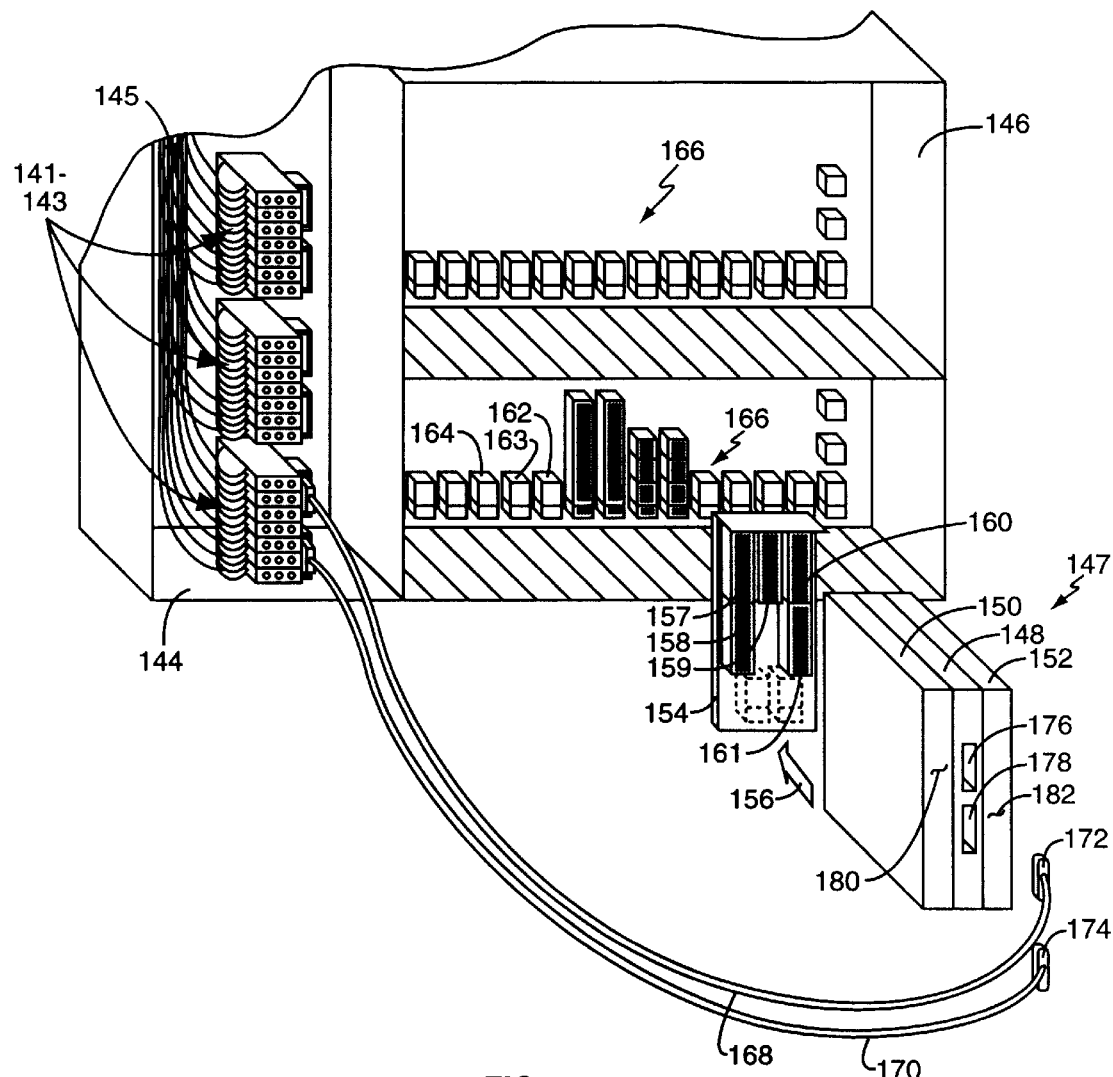
FIG. 6, is a partially exploded, perspective illustration mounting embodiment of the apparatus of FIG. 1 in a network hardware installation.

Referring now to FIG. 6, which is a figurative, exploded perspective view of a portion of the equipment mounting cabinet. The CTUs 141–143 are shown mounted in cabinetry 144 which is located adjacent the cabinet 146 that houses the LSA 147. The LSA 147 itself comprises a TIM 148, IEMs 150, 152, and mini-backplane assembly 154. The LSA module 147 is seated 156 in the mini-backplane 154 and engages the mini-backplane connectors 157–61. The mounted elements are then slid into the cabinet 146 with the mini-backplane reverse side connectors (shown in phantom) mechanically and electrically engaging connectors 162–164 of the master backplane 166 of the cabinet 146.

In a best mode embodiment, the TIM 148 is connected to its associated CTU through cables 168, 170 which correspond to the TRANSMIT and RECEIVE pairs of each of the 21 PCM 30 (or 28 DS-1) two pair trunk lines. As shown in FIG. 6, the TIM 148 receives the CTU trunk lines in cables 168, 170 at the front of the cabinet 146, within easy access of the system operator. Similarly, the IEMs 150, 152 include interactive face plates 180, 182 which, as described in detail hereinafter with respect to FIGS. 7, 8 provide a human machine interface (HMI) at the front of the cabinet to allow easy access and interactive response between the service operator and the network diagnostic functions.

Figure 7:
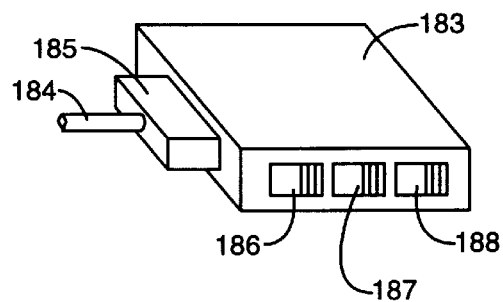
FIG. 7 is a perspective illustration of one element of the embodiment FIG. 6.
Figure 8:
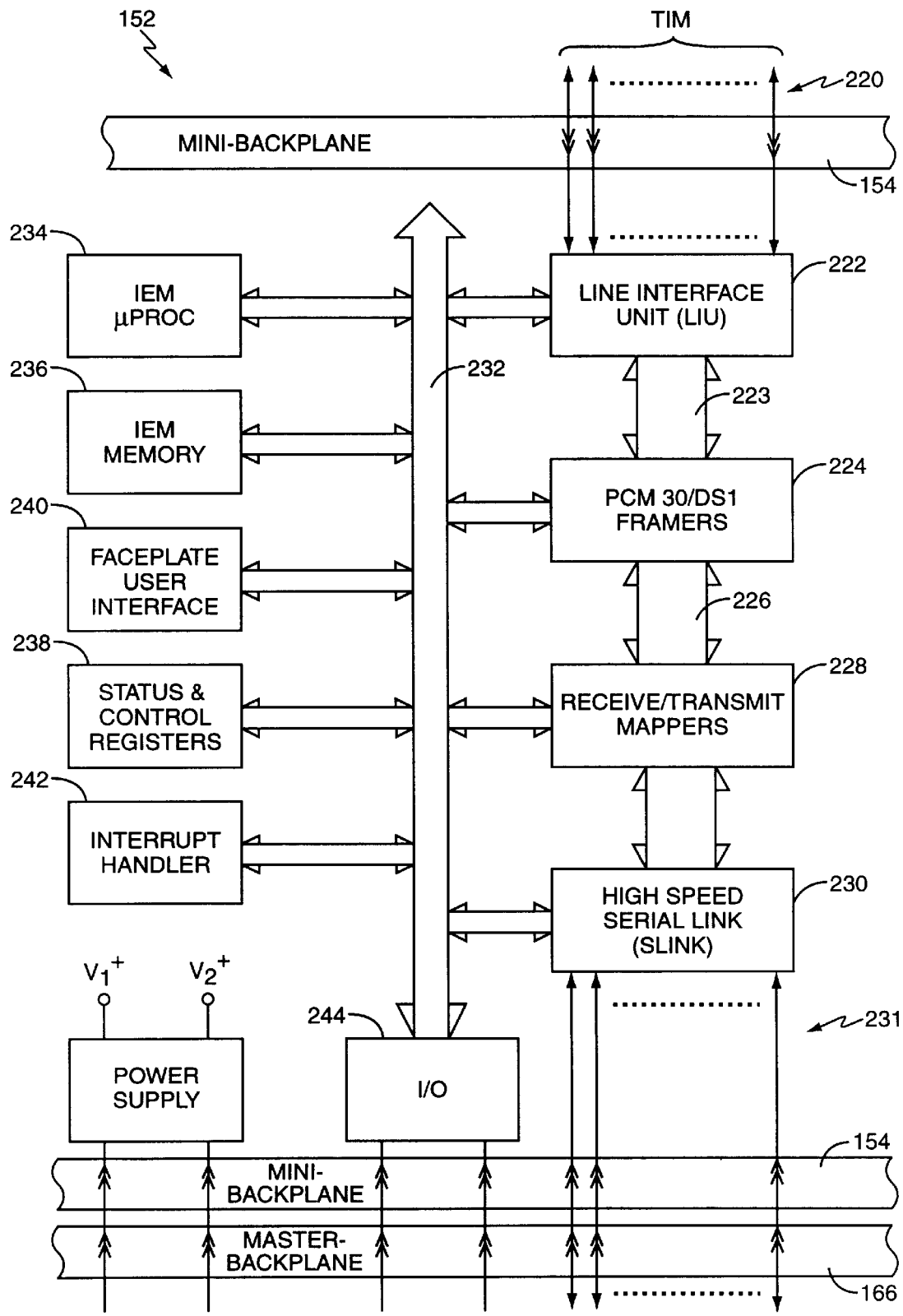
FIG. 8 is a schematic block diagram of an interface electronics module in which the present invention may be used.

FIG. 7 is a close-up illustration of the face of a CTM 183 of the type included within the CTUs 141–143 in cabinet 144. The CTM 183 receives three PCM 30 trunk lines (or four DS-1 trunk lines) within the lines 184 from the customer wiring 145 (FIG. 6) at a connector 185. The face of the CTM 183 includes three dual position loopback switches 186–188. The switches provide the operator with the front panel ability to loopback each PCM 30 span to the LSA (e.g. 147) or to the customer wiring (e.g. the MDF 100, FIG. 5) in order to isolate a trunk line fault to one of the two sectors. This loopback testing ability is positioned in close proximity to the operator's faceplate access at the LSA, providing the operator to observe the change in system fault conditions as a result of loopback testing.

Figure 1:
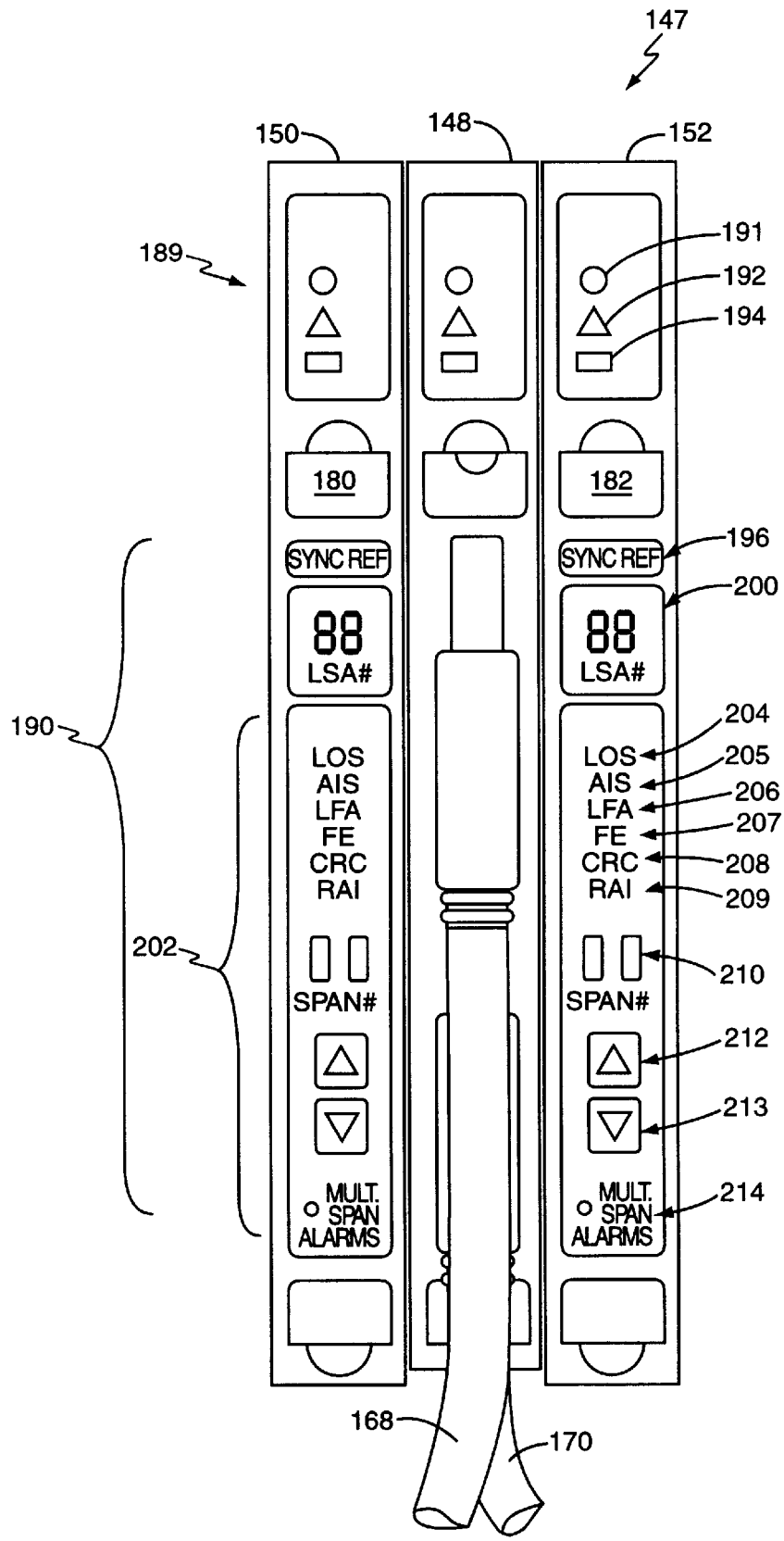
FIG. 1, is an elevation view of interactive faceplate apparatus according to the present invention.

Referring now to FIG. 1, which is a front elevation of the LSA 147 with the TIM 148 and IEMs 150, 152 mounted in a module configuration. The faceplates 180, 182 of the IEMs 150, 152 have the same HMI indicia. As described hereinafter, the face plate indicia includes both signal annunciators, signal indicators, and input controls which may be manipulated by the technician-operator. As shown with the faceplate 180 of the IEM 150, the HMI indicia is grouped into two categories, including an LSA status indicator (sometimes referred to as "Locklatch Indicators) 189 and an array 190 of signal annunciators, which are further described in detail hereinafter.

As described hereinbefore only one of the two IEMs in each LSA is active at a time; the other is in a "stand-by mode"; with its two catagories, or groups, of indicators 189, 190 inactive, and unlighted. Alternatively, the indicators of the active IEM are lighted so the active IEM is immediately obvious to the observer-operator. In FIG. 1 it is assumed the LSA 150 is inactive, shown with its indicators in an unlighted or "gray" state while the IEM 152 is active with its indicators lighted, as shown in a more resolute "black and white" state.

Referring to the IEM 152, in a best mode embodiment, the locklatch indicators 189 have geometric shapes, including a circular indicator 191, a triangular indicator 192, and a rectangular indicator 194. The circular indicator 191 is preferably an amber color light emitting diode (LED) which when un-lighted indicates that all external signals to the IEM appear to be valid and when lighted indicates that at least one of external inputs is invalid. The triangular indicator 192, which is preferably a red LED, and the

TABLE I

| GREEN | RED | MODULE STATE |
|---|---|---|
| Off | Off | Unpowered (Inactive) |
| On | On | Power-up LED test |
| Wink | Off | Power-up self test underway |
| On | Off | Do not remove module |
| Off | Wink | Module is being indicated |
| Off | On | Module may be removed | rectangular indicator 194, which is preferably a green LED, operate in combination with ON, OFF, and WINK states to report IEM status in one of six states, as listed in Table I.

The array 190 of signal annunciators include status indicators 196 and 200. In the best mode embodiment the indicator 196 is shown as a masked, back-illuminated "Synch Ref" indicator which, when illuminated, indicates that its associated IEM is serving as the synch reference for the modules installed in the cabinet 146. The indicator 200 is an alpha-numeric display which indicates the particular LSA module number, which is intended to assist the operator in associating a particular LSA with its related CTU (e.g. 141–143, FIG. 6) in cabinetry 144 (FIG. 6).

The annunciator array 190 further includes a fault indicator subgroup 202, comprising specific fault condition annunciators 204–209. The embodied annunciators include; Loss of Signal (LOS) 204, Alarm Indication Signal (AIS) 205, Loss of Frame Alignment (LFA) 206, a Frame Error (FE) 207, a Cyclic Redundancy Check (CRC) 208, and a Remote Alarm Indication (RAI) 209. In the preferred embodiment, the annunciators include a backlighted mask with a translucent cut-out corresponding to the alpha-numeric characters of the related fault. The indicators are lighted red whenever its associated fault condition is detected on any of the trunk lines.

The particular fault indication reported by the subgroup 202 is associated with the particular span identified in a SPAN #, two digit LED display 210. The SPAN # indicator is a preferably tristate, indicating either "OK" if there are no problems on any of the trunk lines, or a trunk line number if there is a detected fault. The inactive IEM in a given LSA (such as the IEM 150 of the LSA 147) will display the "--".

The operator-technician may select a particular span to be displayed by using the "UP arrow" and "DOWN arrow" buttons 212, 213 which, when depressed, increment and decrement the SPAN # (i.e. trunk line number) thereby allowing the operator to select individual trunk lines for status and fault display on the fault indicators 204–209. Finally, a "Multiple Spans Alarm" lamp 214 is a red LED which blinks when there are alarms on more than one span, thereby alerting the operator to look at more than one span in performing the fault isolation analysis.

FIG. 8 is a simplified schematic block diagram of the IEM 152 (FIG. 1) which receives the trunk lines 220 through the mini-backplane 154 (FIG. 6), from the TIM 148 (FIGS. 6). The trunk lines 220 are presented to a Line Interface Unit (LIU) 222 that terminates the incoming trunk lines at individual double pole double throw relay switches (not shown) that are selectively actuated to route the trunk lines into the active IEM (and isolating them from the inactive IEM). The LIU also provides bi-directional signal conversion; converting the bipolar AMI ternary level signals to unipolar PCM signals to be presented to the CEM on the receive side, and it provides the reverse conversion on the transmit side.

The converted span signals are provided through lines 223 lo the signal framing. The framers also provide performance monitoring of the trunk signals, including: CRC Errors, Loss of Frame, Frame Errors, Frame Slips, Loss of Signal, and Code Errors. The framers also provide the Alarm Indication Signal, the Remote Alarm Signal, and the Remote Multi-frame Alarm Signal.

The framed signals are provided on lines 226 to the receive-transmit mappers 228 which function to transfer the payload data between the framers 224 and the high-speed serial link (SLINK) 230 and, in the reverse direction from the SLINK to the mappers. The signals are then provided on lines 231 through the mini-backplane 154 to the master backplane 166 (FIG. 6) of the equipment cabinetry 146 (FIG. 6).

Each of the trunk signal conditioning functions are connected to an IEM bus 232 to the IEM signal processor 234, which is a known type such as the MOTOROLA model MC68360 microprocessor. The IEM signal memory 236 includes both dynamic RAM (DRAM) as well as flash EEPROM.

The signal fault conditions detected by the IEM signal processor 234 are stored in the IEM memory 236, and forwarded to the service center at the OMC-R (44, FIG. 2). Each trunk line is sampled in each succeeding sample interval and the new sample results are written over the stored results. Between samples the processor 234 transfers the stored data through the bus 232 to faceplate user interface circuitry 240, which provides the display drivers for all of the front panel display indicators 191–210 and multiple span alarms 214. It also transduces the UP and DOWN button commands into increment and decrement signals which are presented through bus 232 to the signal processor 234. An interrupt handler 242 is used to consolidate all of the external interrupts that are received through input/output (I/O) interface 244 onto one of 7 levels of interrupts recognized by the MC68360 processor (234).

The LSA of the present invention provides a modular unit which is suitable for retrofit installation in existing telephone equipment cabinetry and when installed, the interactive faceplate of the IEM provides the network operator with easy access to the signal fault display and the ability to command the display of signal faults on any trunk line within the IEM.

Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

We claim:

1. Apparatus, for use with signal network equipment of the type having modular units which are interconnected through the master backplane of an equipment mounting cabinet to control, through use of a programmed network equipment signal processor, the exchange of network format signals between network subscribers over network trunk lines, the apparatus comprising:

an interface electronics module (IEM), having an IEM signal processor and associated IEM signal memory, for performing signal analysis of the network format signals to detect the presence and absence of signal fault conditions on a plurality of network trunk lines received therein and for providing signal indicia thereof, said IEM having a housing with a faceplate and an IEM signal connector for receiving said plurality of network trunk lines, said housing being adapted for releasable mounting in the equipment mounting cabinet in a manner so as to position said faceplate in an operator viewable location when said IEM signal connector is engaged with the master backplane; and a control panel, adapted for mounting to said faceplate and having an array of viewable signal display apparatus and one or more operator controlled input devices disposed thereon, each said signal display being responsive to said signal indicia from said IEM and to said operator controlled input devices for providing, in response to commands from said operator controlled input devices, a viewable display of selectable ones of the IEM detected signal fault conditions.

2. The apparatus of claim 1, wherein said faceplate and said signal connector are disposed at distal ends of said housing.

3. The apparatus of claim 1, wherein:

said IEM signal processor performs said signal analysis of the network format signals on each network trunk line received at said signal connector in successive sample time intervals to detect in each sample interval the presence and absence of a selected type of signal fault conditions, said IEM signal processor storing the analysis results of each sample interval for each, sampled trunk line in said IEM signal memory;

said operator controlled input devices include apparatus for providing operator command signals to said IEM signal processor, including a trunk selection command signal capable of identifying each individual trunk line analyzed by said IEM, said IEM signal processor providing to said viewable signal display apparatus in response to said trunk selection command signal, the current sample interval signal fault conditions which are stored in said IEM signal memory for the identified trunk line; and said array of viewable signal display apparatus comprises a first group of signal annunciators, each first group signal annunciator being associated with one of said selected type signal fault conditions, and each said annunciator displaying the current sample interval signal fault conditions associated with the trunk line identified by a current said trunk selection command signal, said array of signal display apparatus further comprising a second group of signal annunciators for displaying the identity of the trunk line associated with a current trunk selection command signal.

4. The apparatus of claim 3, wherein each first group signal annunciator comprises one or more alpha numeric characters which identify the associated type signal fault condition, said alpha numeric characters being visibly illuminated in the presence of the associated signal fault condition and being non-illuminated in the absence of said signal fault condition.

5. The apparatus of claim 4, wherein said first group of signal annunciators each comprise a mask with a translucent portion in a configuration of the alpha-numeric character which is symbolic of the associated signal fault condition, and backlight apparatus capable of providing illumination of said mask in the presence of said associated signal fault condition.

6. The apparatus of claim 3, wherein said first group of signal annunciators each provide a three character alpha-numeric display to identify the associated signal fault condition.

7. The apparatus of claim 3, wherein said second group of signal annunciators comprise one or more light emitting diodes.

8. The apparatus of claim 3, wherein said operator controlled command input devices comprise a pair of depressable switches which, when depressed, alternately increment and decrement through a list of trunk line identifiers to identify, when released, the current trunk line identified in said trunk command signal.

9. The apparatus of claim 3, wherein:

said IEM signal memory further includes stored program signals which command the IEM signal processor to periodically perform a self test of the IEM functional performance and to provide, in the presence of a detected IEM functional fault, a signal indication thereof; and said array of viewable signal display devices include a third group of signal annunciators which are responsive to said signal indications of an IEM functional fault, to provide a viewable display of the current state of IEM functional performance.

10. The apparatus of claim 9, further comprising:

a termination interface module (TIM) adapted to be releasably joined to said IEM through an adaptive backplane assembly to form a retrofit modular unit capable of being releasably mounted in the equipment mounting cabinet, said adaptive backplane assembly being capable of electrically connecting said IEM and said TIM to the master backplane of the equipment mounting cabinet with installation of said retrofit modular unit therein.

11. The apparatus of claim 10, further comprising:

a second IEM to provide said retrofit modular unit with high IEM performance reliability, wherein one IEM is active and the second IEM is standby, said standby IEM assuming IEM functional performance in response to detection of a functional fault in said active IEM; and wherein said TIM is adapted to be releasably joined through said adaptive backplane assembly to said active and said standby IEM, said TIM being further adapted to receive the plurality of trunk lines therein and to distribute said trunk lines to each said IEM through said adaptive backplane assembly.

12. The apparatus of claim 11, wherein:

each said IEM further comprises a line interface unit (LIU) for receiving therein the plurality of trunk lines, said LIU including switching means responsive to command signals received from the associated IEM signal processor to connect and, alternately, not to connect the trunk lines to its associated IEM in dependence on said IEM being active or standby, respectively.

13. The method of providing an operator interactive interface for detecting trunk line signal faults in telephone network equipment having plural modules which are interconnected with releasable engagement of the module's connector with a mating connector in the master backplane of the telephone equipment cabinetry, so as to allow the equipment to control the exchange of network format signals between network subscribers over the trunk lines, and to control the exchange of equipment format signals between equipment modules, comprising:

providing an interface electronics module (IEM), having an IEM signal processor and associated IEM signal memory, for performing signal analysis of the network format signals to detect the presence and absence of signal fault conditions on a plurality of network trunk lines and for providing signal indicia thereof;

enclosing said IEM in a housing having a faceplate and a signal connector for receiving the plurality of network trunk lines;

adapting said housing for releasable mounting in the telephone equipment cabinet in a manner so as to position said faceplate in an operator viewable location concurrent with the engagement of said signal connector with the master backplane; and installing a control panel on said faceplate, said control panel having an array of viewable signal display apparatus and one or more operator control devices disposed thereon, each said signal display being responsive to said signal indicia and to said operator control devices for providing a viewable display of the presence and absence of signal fault conditions at said control panel, in response to said operator control devices.

14. The method of claim 13, wherein said step of enclosing includes:

mounting said faceplate and said connector at distal ends of said housing.

15. The method of claim 13, wherein:

said step of providing includes having said IEM signal processor perform said signal analysis of the network format signals on each network trunk line received therein, in successive sample time intervals to detect in each sample interval the presence and absence of a selected type of signal fault conditions, and having said IEM signal processor store the analysis results of each sample interval for each sampled trunk line in said IEM signal memory; and said step of installing further includes:

having said operator controlled input devices provide, in response to operator entry, a trunk selection command signal which identifies to said IEM signal processor a selected one of the plurality of network trunk lines, said IEM signal processor providing to said viewable signal display apparatus in response thereto the current sample interval signal fault conditions stored in said IEM signal memory for the identified trunk line; and including among said array of viewable signal display apparatus a first group and a second group of signal annunciators, each first group signal annunciator being associated with one of said selected type signal fault conditions and each displaying the current sample interval signal fault conditions associated with the trunk line identified by a current said trunk selection command signal, said second group of signal annunciators displaying the identity of the trunk line associated with a current trunk selection command signal.

16. The method of claim 15, wherein each first group signal annunciator comprises one or more alpha numeric characters which identify the associated type signal fault condition, said alpha numeric characters being visibly illuminated in the presence of the associated signal fault condition and being non-illuminated in the absence of said signal fault condition.

17. The method of claim 16, wherein said first group of signal annunciators each comprise a mask with a translucent portion in a configuration of the alpha-numeric character which is symbolic of the associated signal fault condition, and backlight apparatus capable of providing illumination of said mask in the presence of said associated signal fault condition.

18. The method of claim 15, wherein said first group of signal annunciators each provide a three character alphanumeric display to identify the associated signal fault condition.

19. The method of claim 15, wherein said second group of signal annunciators comprise one or more light emitting diodes.

20. The method of claim 15, wherein said operator controlled command input devices comprise a pair of depressable switches which, when depressed, alternately increment and decrement through a list of trunk line identifiers to identify, when released, the current trunk line identified in said trunk command signal.

21. The method of claim 15, wherein:

said step of providing further includes having said IEM signal memory include stored program signals which command the IEM signal processor to periodically perform a self test of the IEM functional performance and to provide, in the presence of a detected IEM functional fault, a signal indication thereof; and said step of including further provides a third group of signal annunciators which are responsive to said signal indications of an IEM functional fault, to provide a viewable display of the current state of IEM functional performance.

22. The method of claim 21, further comprising:

joining to said IEM, through an adaptive backplane assembly and in a fixedly releasable manner, a termination interface module (TIM), to form a retrofit modular unit capable of being releasably mounted in the equipment mounting cabinet, said adaptive backplane assembly being capable of electrically connecting said IEM and said TIM to the master backplane of the equipment mounting cabinet with installation of said retrofit modular unit therein.

23. The method of claim 22, further comprising:

providing said retrofit modular unit with first and second IEMs to provide said retrofit modular unit with high IEM performance reliability, wherein one IEM is active and the second IEM is standby, and, said standby IEM assuming active IEM status in response to detection of a functional fault in said prior active IEM; and wherein said TIM is adapted to be joined through said adaptive backplane assembly, in a fixedly releasable manner to each IEM, said TIM being further adapted to receive the plurality of trunk lines therein and to distribute said trunk lines to each said IEM through said adaptive backplane assembly.

24. The method claim 23, wherein:

each said IEM further comprises a line interface unit (LIU) for receiving therein the plurality of trunk lines, said LIU including switching means responsive to command signals received from the associated IEM signal processor to connect and, alternately, not to connect the trunk lines to its associated IEM in dependence on said IEM being active or standby, respectively.

\* \* \* \* \*